Feb. 26, 1946.   C. B. LIVERS   2,395,633
FLUID DRIVE CONTROL VALVE
Filed Sept. 8, 1941   5 Sheets-Sheet 3

Inventor
CARLOS BENJAMIN LIVERS
By Hazard & Miller
Attorneys

Patented Feb. 26, 1946

2,395,633

UNITED STATES PATENT OFFICE 2,395,633

FLUID DRIVE CONTROL VALVE

Carlos Benjamin Livers, San Diego, Calif.

Application September 8, 1941, Serial No. 409,956

6 Claims. (Cl. 60—97)

This invention relates to a control for fluid drives wherein there is a fluid driven motor or piston in a cylinder operated by fluid pressure.

In fluid drives to which the present invention is particularly applicable there is a supply line for fluid under pressure that drives the motor or piston in a cylinder and a return line from the motor conveying exhaust fluid therefrom which returns the exhaust fluid to a pump or the source of supply of fluid pressure. Frequently, the motor is reversible so that on reverse, the line which originally functioned as a supply line functions as the return line and the line which originally functioned as the return line serves as a supply line.

As a means for controlling the fluid flow to and from the motor, it is desirable to use a valve of the poppet type because of the ability to quickly move the valve from fully closed to fully open position with a minimum amount of throw or actual movement of the valve. Particularly is this true when the fluid drive is utilized in connection with gun mounts wherein one fluid drive serves to bring about a traverse of the gun or the turret in which it may be mounted and another fluid drive is utilized to bring about the elevation of the gun.

The objection to a simple poppet valve in the supply and return lines to and from the motor resides in the fact that it is very difficult to so control the valve that the motor will be driven at slow speeds. In other words, when the poppet valve is but slightly lifted from its seat a considerable volume of fluid is permitted to pass. Consequently, with the use of a simple poppet valve the motor usually is caused to run or operate at a fair degree of speed or else be entirely stopped.

A primary object of the present invention is to provide an improved valve for controlling fluid flow to and from a fluid operated motor which retains all of the advantages of a poppet type valve and in addition thereto a means for metering the flow through the valve when the valve is open, the metering means being automatically operable or brought into operation and functioning independently of the opening between the head of the poppet valve and its seat. In this way the valve may be easily and quickly fully opened to secure a maximum flow to and from the motor to accomplish speedy operation but when slow operation or fine adjustments are required these can also be secured to a much finer degree than that capable of being accomplished by causing the head of the poppet valve to approach its seat.

The ability to nicely control small volumes of flow to and from the motor is what is commonly called "feel" in the hands of the operator, it being desirable in most instances to but slightly touch the control handle to produce a positive but nevertheless very slight operation of the fluid driven motor.

Another object of the invention is to provide a fluid drive having a supply line and a return line with control valves of the poppet type, each of which is equipped with a metering means that becomes effective on opening the valve. With the metering means so arranged that the major portion of the metering in the fluid circuit is sometimes accomplished by the metering means in the supply line and at other times the major portion of the metering is accomplished by the metering means in the return line. By proper variation or adjustment of the metering means virtually any desired "feel" can be secured for controlling small or minor speed operations of the fluid driven motor and consequently of the turret and gun.

Another object of the invention is to provide a valve having the above-mentioned characteristics which is so designed that a fine adjustment of the parts is permissible.

Another object of the invention is to provide a control valve for a fluid drive wherein the valves controlling the supply line and the return line are operated off of a cam shaft common to both valves whereby, upon rotation of the cam shaft, the supply line valve and the return line valve will both be opened, the arrangement being such as to secure an automatic balancing of the valves when the structure is in neutral or closed position.

Still another object of the invention is to provide a control for fluid drives having the above characteristics which is so constructed that upon release of the control handles or grips that the valves by reason of their construction will automatically close or return to their neutral position stopping all further flow that would tend to drive the motor.

With the foregoing and other objects in view, which will be made manifest in the following detailed description and specifically pointed out in the appended claims, reference is had to the accompanying drawings for an illustrative embodiment of the invention, wherein:

Fig. 6 is a broken line;

Referring to the accompanying drawings wherein similar reference characters designate similar parts throughout, inasmuch as the present valve has been primarily designed for controlling the fluid circuits for hydraulically driven motors employed to elevate guns and to rotate turrets in which the guns may be installed, the present invention will be described in reference thereto although it will be understood that the present invention is in no way restricted in its application to use in connection with ordnance but may be generally employed wherever it is desired to have a fine degree of control over hydraulically driven motors at slow speeds.

The device consists of a main valve housing 10 which may be equipped at one corner with a suitable supporting arm or bracket 11 by which the housing may be suitably mounted within the turret. On the top of the main valve housing there is supported a hollow column 12, this being mounted for rotation about a vertical axis by means of anitfriction bearings 13 and 14 which rotatably support a bushing 15 on which the hollow column 12 is screwed. One side of the column may be split and equipped with ears 16 for the reception of a clamping bolt that rigidly fastens the column to the bushing.

Figures 1, 2:
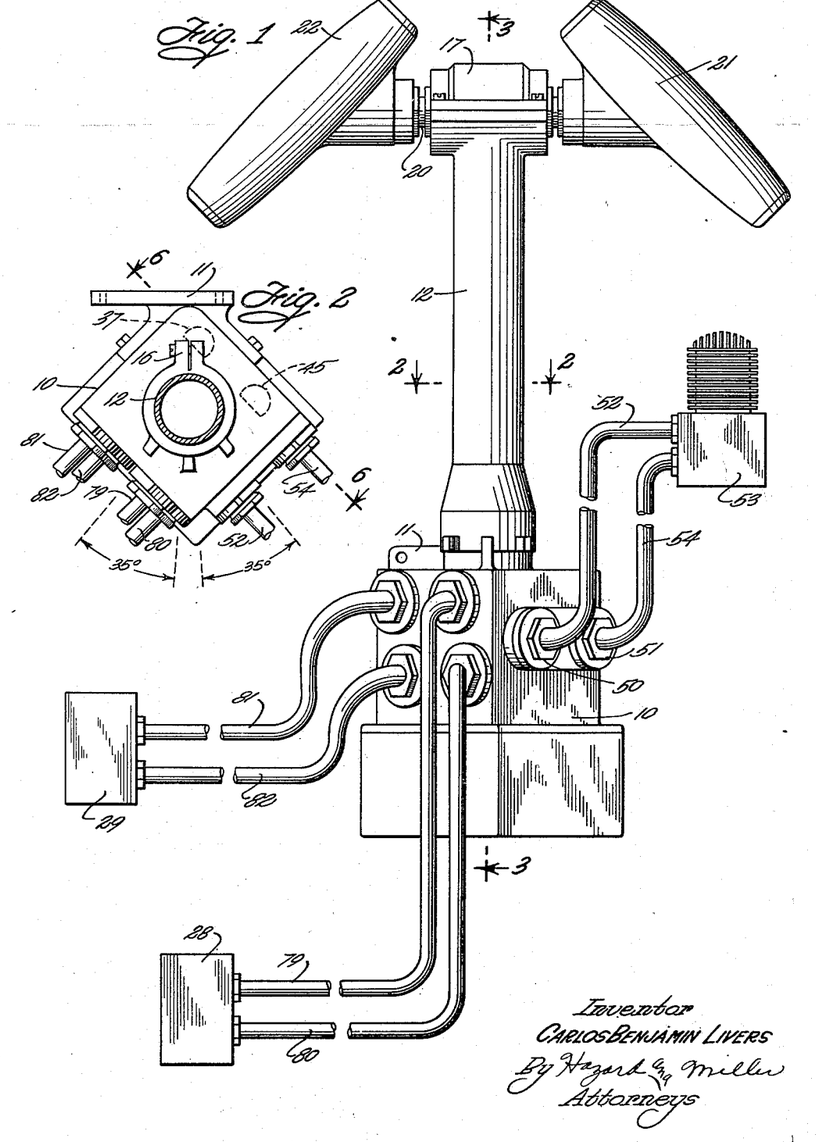
Figure 1 is a view in front elevation of a structure embodying the present invention, the pump or source of fluid under pressure and the fluid driven motors being illustrated somewhat diagrammatically.
Fig. 2 is a horizontal section taken substantially upon the line 2—2 upon Fig. 1.
Figures 3, 4:
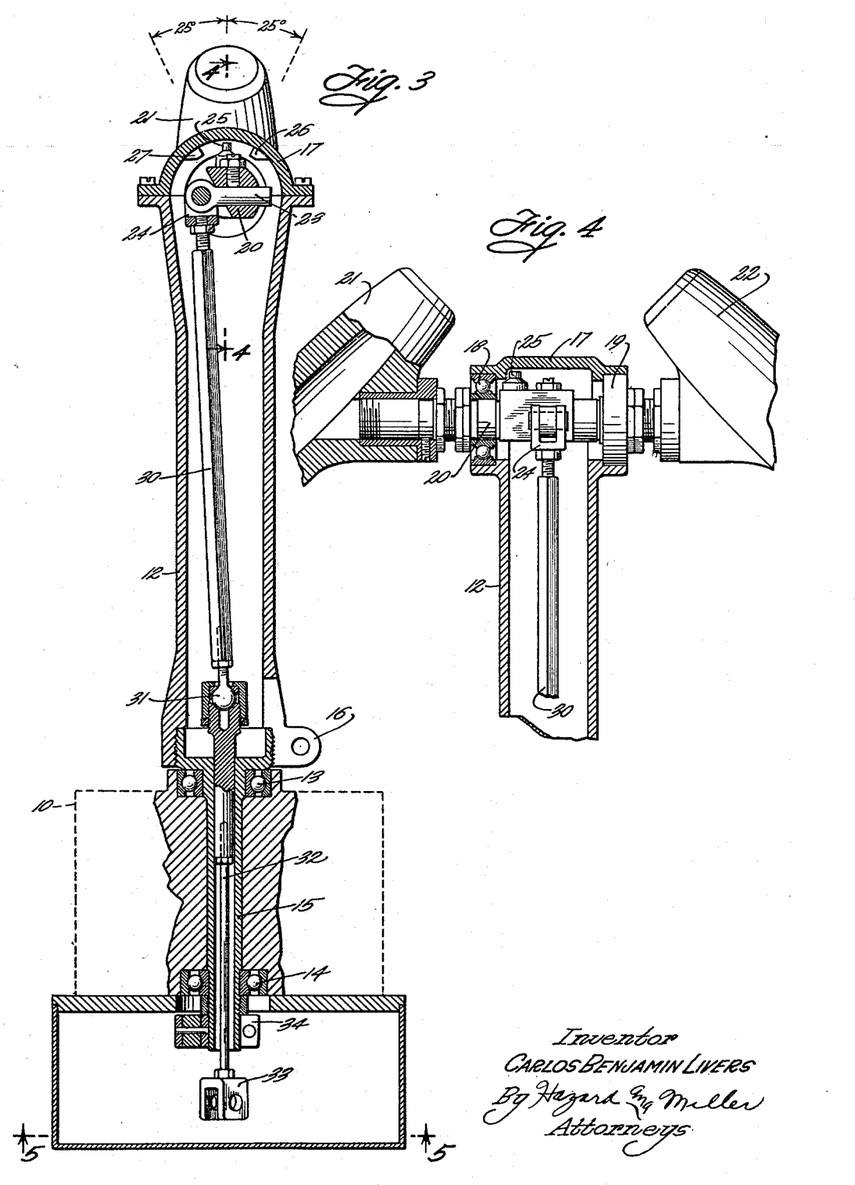
Fig. 3 is a vertical section taken substantially upon the line 3—3 upon Fig. 1.
Fig. 4 is a partial view in vertical section taken substantially upon the line 4—4 upon Fig. 3 in the direction indicated.
Figure 5:
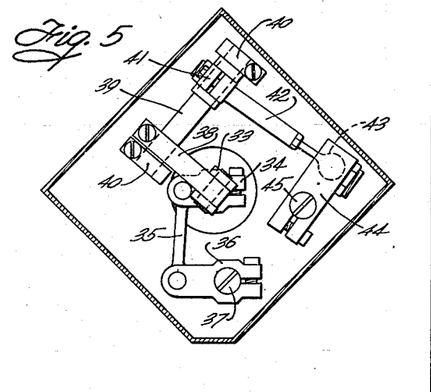
Fig. 5 is a horizontal section taken substantially upon the line 5—5 upon Fig. 3 in the direction indicated.

The column 12 has a cap 17 which when tightened, clamps anti-friction bearings 18 and 19 for a rock shaft 20. On the outer ends of the rock shaft, hand grips 21 and 22 are suitably mounted. The rock shaft has its center portion between the bearings 18 and 19 shaped as illustrated in Fig. 3 to accommodate the pin 23 of a hinge 24. A boss 25 is formed on the rock shaft which operates between opposed stops 26 and 27 limiting rotation of the rock shaft about its horizontal axis. The hand grips 21 and 22 may be rotated about the horizontal axis of the rock shaft 20 or by means of the rock shaft the entire column 12 and bushing 15 can be rotated relatively to the valve housing 10. Normally rotation of the hand grips 21 and 22 about a horizontal axis is intended to control the fluid circuit for the fluid driven motor 28 which brings about the elevation of the gun. Rotation of the hand grips 21 and 22 about a vertical axis wherein the column 12 and bushing 15 are also rotated brings about an operation of the motor 29 that rotates the turret or brings about a traverse of the gun. Thus, by a single manipulation of the hand grips the gun may be elevated or depressed or rotated toward the right or to the left, it being understood that the motors 28 and 29 are reversible. A combination of movements of the hand grips can be made to cause the gun to be simultaneously moved in a vertical as well as a rotary direction.

An adjustable link 30 connects the hinge 24 to a ball joint 31 arranged coaxially with the bushing 15. This ball joint in turn is connected by an adjustable link or rod 32 to a clevis 33. By this arrangement rotation of the hand grips 21 and 22 together with the column 12 will not in any way influence the clevis 33 which is operatively connected to the valves which bring about elevation or depression of the gun. Thus, although the hinge 24 is not in alignment with bushing 15 rotation of the hinge about the vertical axis of column 12 does not influence clevis 33, the ball of the ball joint merely turning within its socket. Likewise rotation of the hand grips 21 and 22 about a horizontal axis does not influence the position of column 12 and bushing 15 which in turn is operatively connected to the valves of the circuit effecting rotary movement of the turret or traverse of the gun.

On the bottom of bushing 15 there is a clamp 34 which is connected by means of a link 35 to a similar clamp 36 on the bottom of a cam shaft 37. The clevis 33 is connected by means of a bellcrank 38 to a small rock shaft 39 which is rotatably supported as by bearings 40 on the bottom of the valve housing. This rock shaft has a downwardly extending bellcrank 41 to which an arm 42 is connected which in turn is connected by a ball and socket joint 43 to a clamp 44 which is on the bottom of a cam shaft 45. No loose connection is necessary between clevis 33 and rock shaft 39 despite the fact that rotation of the rock shaft 39 will cause the swinging end of arm 38 to travel through an arc. Such arcuate movement is compensated for by the mere bending of the rod 32.

The linkage above described serves to transmit rotary motion of column 12 and bushing 15 through link 25 and clamp 36 to the cam shaft 37. Pulls or pushes imposed upon link 32 by rotating the hand grips 21 and 22 about a horizontal axis are translated through arm 38, rock shaft 39, arm 41, links 42 and clamp 44 into rotary motion imparted to the cam shaft 45. The cam shafts 37 and 45 each operates its respective pairs of valve sets, one valve of each valve set being illustrated in Fig. 7 and the complete valve set for cam shaft 45 being illustrated in Fig. 8. In the side of the valve housing there are formed two openings 50 and 51. To the opening 50 is connected a supply line 52 leading from a pump or other source of fluid under pressure indicated at 53. The opening 51 is connected by means of a return line 54 to the inlet to the pump. It will be understood that the pump serves to constantly supply fluid to the valve housing under high pressure through line 52 and this fluid that is thus supplied may be utilized in either direction through motors 28 and 29. The exhaust or return fluid from the motors is returned through the valve housing to the return line 54 and thus returned to the pump.

Figure 6:
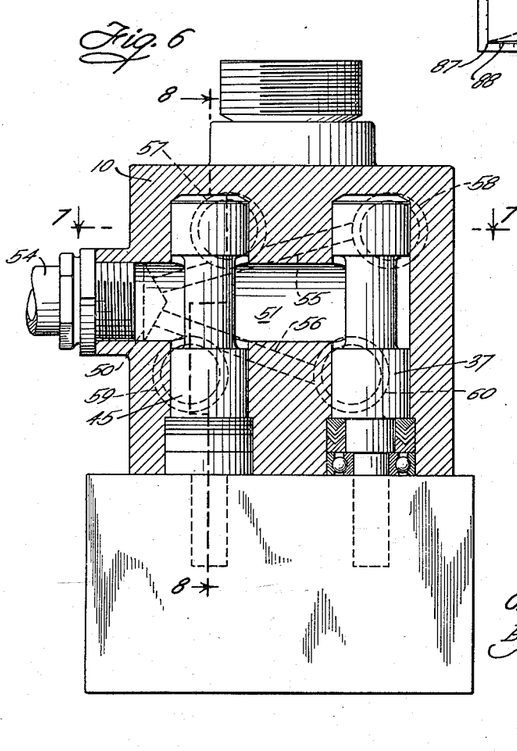
Fig. 6 is a sectional view through the valve housing and is taken substantially upon the line 6—6 upon Fig. 2 in the direction indicated.
Figure 7:
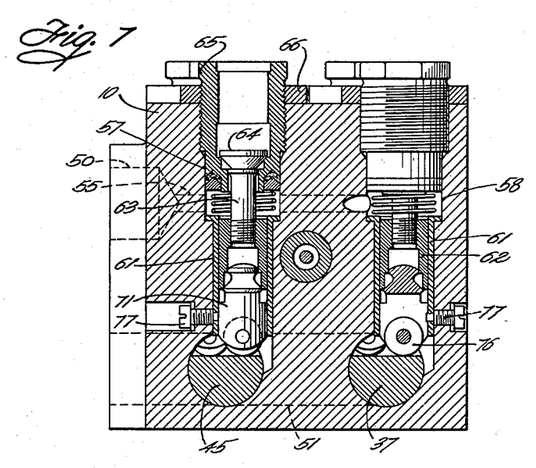
Fig. 7 is a sectional view taken substantially upon the line 7—7 upon Fig. 6.
Figure 8:
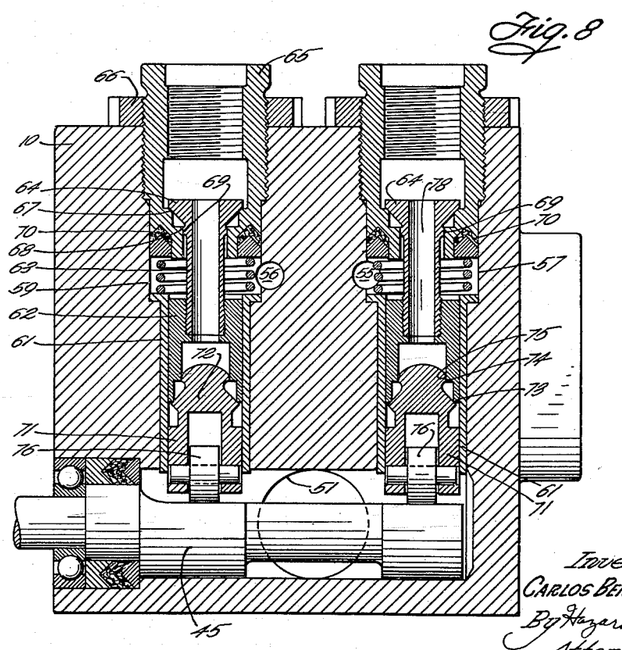
Fig. 8 is a sectional view taken substantially upon the line 8—8 upon Fig. 6, it being noted that the line 8—8 upon

The opening 50 is branched within the valve housing 10, the branches being indicated at 55 and 56, see Figs. 6, 7, and 8. Within the housing there are four horizontally arranged valve bores 57, 58, 59, and 60. These valve bores are somewhat staggered with relation to each other, valve bores 57 and 59 being slightly offset with respect to the center line of cam shaft 45. Similarly, valve bores 58 and 60 are oppositely offset with respect to the center line or axis of rotation of cam shaft 37. The branches 55 and 56 communicate with all of the valve bores 57, 58, 59, and 60 intermediate their ends. In each valve bore there is disposed a bushing 61 which communicates with the chamber within which its cam shaft 37 or 45 rotates. Within the bushing there is slidably disposed a valve-seat providing member 62 and a tubular poppet valve 63 having a head 64 which has its hollow stem threaded into the top of a piston or valve-seat providing member 62. A valve seat 65 is screwed into the valve housing 10 and is held in adjusted position by means of a locknut 66. This valve seat provides a seating surface 67 engageable by the head 64 of the valve. It also provides a shoulder 68 that is adapted to cooperate with an enlargement 69 on the valve stem to meter the flow of fluid from the branches 55 or 56, as the case may be, outwardly through the valve seat 65. A spring is compressed between bushing 61 and packing 70 so as to prevent any leakage from a branch 55 or 56 outwardly through or between the threads on the valve seats 65.

It will be noted that the exposed area on the top of piston or valve-seat providing member 62 is greater than the exposed area on the bottom of bead 64 of the poppet type valve. Consequently, the poppet type valve will be normally urged into closed or seating position as illustrated in Fig. 8.

The poppet type valve having the head 64 constitutes an inlet valve controlling the supply of fluid pressure from the pump to its respective motor 28 or 29. Within bushing 61 there is slidably disposed an outlet valve 71 which may be also regarded as being of the poppet type having a valve head 72 adapted to seat upon a valve seat 73 provided by the valve-seat providing member 62. The valve-seat providing member 62 also provides a shoulder 74 adjacent which is disposed an enlargement 75 formed on the valve. This enlargement is designed to cooperate with the shoulder in metering fluid that is returned and which flows past head 72 when this head is in open position. The valve 71 is bifurcated and equipped with a roller 76 which roller rests upon the flat top surface of its respective cam shaft as clearly shown in Fig. 7. However, as the valve bores are offset or staggered with relation to their cam shafts, one roller 76 will engage the cam shaft on one side of its axis while the roller 76 of the companion valve will engage the top surface of the cam shaft on the opposite side of the axis as illustrated in Fig. 7.

The valves 71 are guided or held against rotation within bushings 61 by means of pins or set screws 77 extending inwardly into the bifurcations that house the rollers 76. The tops of the bifurcations extend sufficiently toward the head 72 so that when fluid is being returned through the valve seat 65 and down through the hollow interior 78 of its stem that this fluid, on passing valve head 72, may enter the bifurcations and pass into the valve or bore that houses the cam shaft. From this chamber or bore the fluid passes into opening 51 from which it flows back to the pump through return line 54. The valve seats 65 in the four valve bores 57, 58, 59, and 60 are in turn connected by lines to their respective motors 28 and 29. Thus, the valve seats in the valve bores associated with cam shaft 45 are connected by lines of tubing 79 and 80 to the elevating and depressing motor 28 while the valve seats 65 in the valve bores that are associated with cam shaft 37 are connected by tubing lines 81 and 82 to the traverse motor 29.

It will be understood that if cam shaft 45 is rotated that one of its valves 71 will be lifted whereas the other valve 71 will be allowed to drop, this being due to the fact that the rollers 76 are laterally spaced with respect to the axis of rotation of the cam shaft. When valve 71 is lifted it lifts its valve-seat providing member 62 and consequently the poppet type inlet valve having the head 64 which is mounted thereon opening the inlet valve and supplying fluid from a branch to a motor. The companion valve 71 will be allowed to descend and disengage its seat 73, thus opening the return line for return flow from the motor. Thus, regardless of which way a cam shaft 37 or 45 is rotated one of its inlet valves will be opened and the corresponding outlet valve in the adjacent valve bore will also be opened. The direction of rotation of the cam shaft controls the direction of fluid supplied to the motor.

Figure 9:
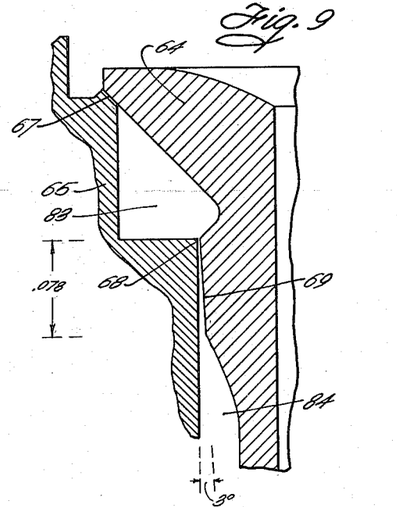
Fig. 9 is a partial view, greatly enlarged, illustrating a typical contour of an inlet valve that supplies fluid to the inlet or supply line that may lead to a fluid driven motor that serves to rotate the turret or produce a traverse of the gun.

Referring now to Figs. 9 to 12, inclusive, it will be noted that the enlargement 69 on the inlet poppet valve is cut with a slight degree of taper. A typical taper is 3° as indicated, and the length of the tapered external surface of the enlargement need only be $78/1000''$ as indicated. The stem of the inlet valve is relieved on both sides of the enlargement as indicated at 83 and 84. When the inlet valve is in seated position as indicated in Fig. 9, the top of the enlargement is directly opposite shoulder 68. Consequently, when the inlet valve is opened so as to disengage the head 64 from its seat 67, the flow to the motor is not governed to any great extent by the amount of opening between the head 64 and the seat 67, but will be governed to a large extent by the degree of opening between the enlargement 69 and shoulder 68. Thus, as the head 64 is forced open the initial slight opening or space between the head 64 and its seat will govern the volume of flow supplied to the motor. As the inlet valve is forced open further so that there is considerable space between the head 64 and seat 67, the enlargement 69 comes into play throttling or metering the fluid flow between its external surface and shoulder 68. Of course, as the valve is lifted due to the taper of the enlargement this space between the enlargement and shoulder 68 continuously increases supplying greater and greater volumes of flow as the valve is opened. The volume supplied however is not commensurate with the amount of opening between head 64 and seat 67 but is governed by the space between the enlargement 69 and shoulder 68. As the valve approaches its fully open position the bottom of the enlargement 69 entirely clears the shoulder 68 and a greater volume of fluid is permitted to pass. In this way all of the advantages of a poppet valve are retained in that slight rotation of a rock shaft will accomplish a full opening of the valve for high speed operation of the motor. Slight rotations of the rock shaft which will serve to only partially open the valve do not bring about a flow of fluid that is commensurate with the opening between the valve head 64 and the valve seat 67, but instead commensurate with the degree of opening between enlargement 69 and shoulder 68.

Figure 10:
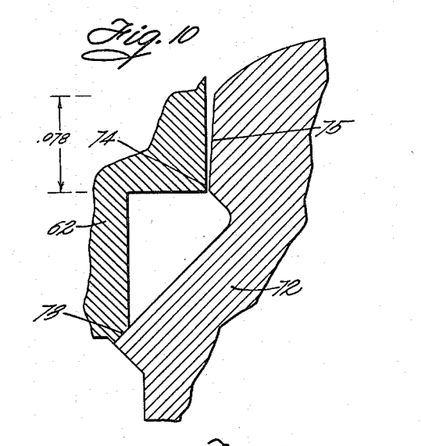
Fig. 10 is a greatly enlarged partial view in vertical section illustrating a typical contour of an outlet valve which controls the outlet in the return line from the motor used to rotate the turret or produce a traverse of the gun.
Figure 11:
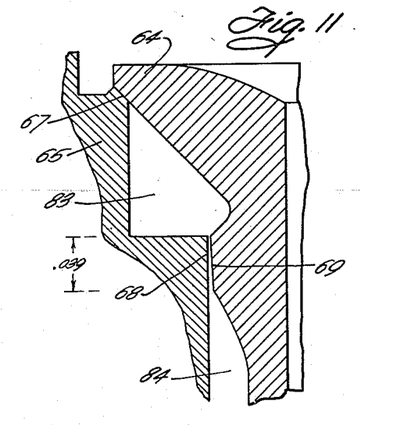
Figs. 11 and 12 are views similar to Figs. 9 and 10 illustrating typical contours of valves that may be employed in the fluid circuit that brings about elevation of the gun.
Figure 12:
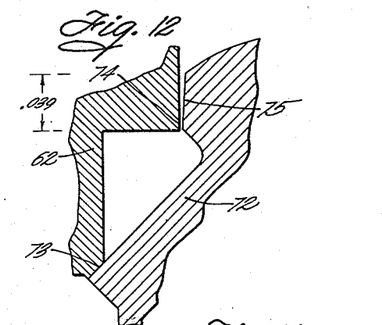
Figure 13:
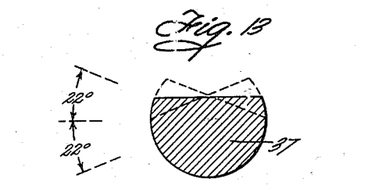
Figs. 13 and 14 are vertical sections through the rock shafts associated with the valves in the two fluid circuits.
Figure 14:
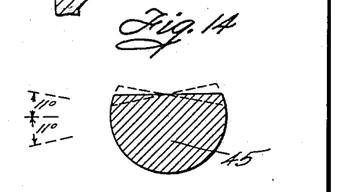
Figure 15:
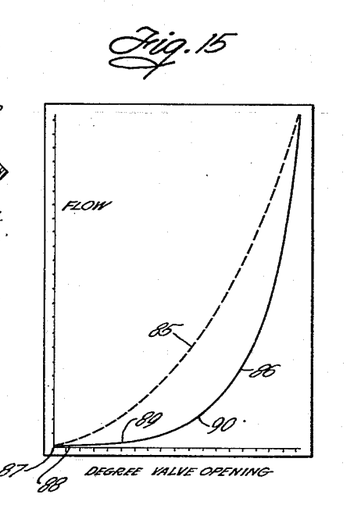
Fig. 15 is a diagram illustrating the rate of flow per degree of valve opening accomplished by means of the valve embodying the present invention.

As illustrated in Fig. 10, the valve 71 is similarly constructed, that is the enlargement 75 has an external taper which is disposed adjacent the shoulder 74. When the valve head 72 leaves its seat 73 the volume of flow through this outlet valve is not commensurate with the degree of opening between the valve and its seat but is commensurate with the degree of opening between the enlargement 75 and its shoulder 74. The contours of these valves do not necessarily have to conform closely to that illustrated in Figs. 9 and 10. Ordinarily, the length of the enlargement in the case of valves controlling the flow of fluid to and from the motor that brings about a traverse of the gun is greater than the lengths of the enlargements on the valves that are in the circuit of the motor that brings about the elevation and depression of the gun. Typical valves and enlargements used in the elevation circuit are illustrated in Figs. 11 and 12, wherein it will be noted that the effective length of the enlargement is considerably smaller or shorter than the effective lengths of the enlargements in Figs. 9 and 10. It is not necessary either that the taper be a straight-line taper as indicated. The taper may be a convex taper or a concave taper. In some instances a combined convex and concave taper or other configuration may be given the enlargement. The shaping of the contours of the enlargements governs to a great extent the "feel" of the entire valve control. Thus, if the volume of flow is plotted per degree of valve opening as illustrated in Fig. 15, the volume of fluid flow per degree of valve opening will rather suddenly increase as indicated by the dotted line 85 on this figure. If the valve is equipped with the metering enlargements and the volume of flow plotted per degree of valve opening a curve such as that indicated by the line 86 will be obtained wherein it will be noted that a considerable degree of valve opening is obtained before any large volume of fluid flow is permitted to pass to the motor. As the valve opening continues however the volume permitted to flow by increases quite rapidly until the valve is fully opened. Consequently, a very fine adjustment or control of the fluid circuit to and from the motor is obtainable. It is possible by proper contour arrangements of the valves to secure virtually any desired curve 86. Manifestly at the start of the curve, that is from points 87 to 88, the shape of the curve is controlled by the head of the valve leaving its seat. From point 88 to point 89 on the curve the major metering may be performed by the enlargement on the inlet valve. From point 89 to point 90 on the curve the major metering may be performed by the enlargement on the outlet valve in the same circuit. By properly shaping the enlargements 69 and 75, the metering and consequently the shape of the curve 86 can be varied considerably. In other words, first one enlargement in a circuit may come into play to be largely effective in metering the flow, and then another enlargement may come into play or both enlargements may be simultaneously effective to meter the flow supplied to, and returned from the motor.

It will be manifest that in as delicate valve control as the present invention affords, that no play should be left between any of the parts transmitting motion from the grips 21 and 22 to the cam shafts 37 and 45. By using pre-loaded bearings, hardened parts, and honing or lapping the fits between the parts, it is possible to have motion transmitted from the grips to the cam shafts 37 and 45 with only about $\frac{1}{1000}''$ play. When this is secured, the advantages of the metering resulting in the delicate "feel" or delicate control are readily apparent to those skilled in utilizing fluid drive control of this character.

By having the valve seat 65 adjustable, a very accurate setting of the construction is possible. Manifestly, the positions of the seating surfaces of the poppet valve heads are governed by the location of the cam shafts, the lengths of the pistons or valve seat providing members, and the lengths of the tubular valves. By having the valve seats 65 adjustable the parts may be easily assembled and the valve seat accurately adjusted with respect to the seating surfaces of its poppet valve head. Thus, no lost motion need be present in the valves themselves. Where the valves are replaced either because of damage or because of a desire for the substitution of a valve to secure an enlargement with a different contour to secure a different "feel" the adjustable valve seat compensates for any minute inaccuracy in the shape of the replacing valve. It is usually desirable to so adjust valve seat 65 that the heads of the inlet valves will be just barely unseated so that even though the cam shafts 37 and 45 are in neutral position a very minute amount of fluid pressure is transmitted to the motor subjecting the motor at all times to the full degree of pressure developed by pump 53 and ready for immediate action as soon as the grips are disturbed. As the pressures supplied to the valves associated with each cam shaft are the same and the valves are urged against the cam shafts by the exposed surfaces on the valve-seat providing member 62, the units associated with each rock shaft tend to balance each other through the cam shaft. Thus, any amount of opening between an inlet valve head 64 and its seat will normally be immediately balanced by an equivalent amount of opening in the companion valve unit. Whenever the grips 21 and 22 are released as the pressure on the pistons or valve-seat providing member 62 has a greater effective area than that exposed on the undersides of the heads 64 the pressure from the pump will serve to automatically seat the inlet valves returning the cam shafts 37 and 45 to their neutral positions. The pressure exerted on the cam shafts is sufficient to operate the linkage connecting the cam shafts with the grips so as to likewise return the grips to their neutral positions. Thus, when the grips are released, further operation of the motors 28 and 29 automatically stops and all parts of the structure instantly return to their original or neutral positions.

It will be noted from the above-described construction that quite a variety of adjustments are permissible after manufacturing to accommodate the construction to a variety of varying conditions in use, and thus acquire the desired "feel." One adjustment is permissible by adjusting the pin 23 of the hinge 24 to vary the throw of the hinge and consequently of the clevis 33 per given rotary movement of the grips 21 and 22. The valve seat 65 can also be readily adjusted and whenever desired, the valves themselves may be easily replaced to secure enlargements on the valves with varying contours which govern the metering of the fluid supplied to and returned from the motors.

From the above-described construction it will be appreciated that an improved control is provided for fluid drives wherein all of the advantages of a quick opening poppet valve are retained and in addition thereto, an automatic delicate metering of the flow is secured during the initial opening of the valve which is desired in securing fine adjustments or slow speed movements of the turret and of the gun.

Various changes may be made in the details of construction without departing from the spirit or scope of the invention as defined by the appended claims.

I claim:

1. A valve structure for a fluid drive wherein there is a fluid pressure source and a reversible fluid pressure operated motor, comprising means for providing a housing having an inlet from the fluid pressure source, a pair of supply conduits leading to opposite sides of the motor, and a return conduit for returning fluid to the source of supply, a tubular poppet type of valve for each of the supply conduits controlling the flow of fluid from the inlet thereto and permitting fluid to be returned from the motor therethrough, a return valve for each tubular valve controlling the return flow therethrough, and operating means common to both return valves for alternately causing the return valves to open and close the passages through their tubular valves respectively and when closed to unseat their tubular valves, direct mechanical connections between each return valve and the operating means, the seats for the tubular valves being adjustable toward and away from the operating means to eliminate loose play between the tubular valves, their return valves and the operating means when all of the valves are in closed position.

2. A valve structure for a fluid drive wherein there is a fluid pressure source and a reversible fluid pressure operated motor, comprising means providing a housing having an inlet from the fluid pressure source, a pair of supply conduits leading to opposite sides of the motor, and a return conduit for returning fluid to the source of supply, a tubular poppet type valve for each of the supply conduits controlling the flow of fluid from the inlet thereto and permitting fluid to be returned from the motor therethrough, a return valve for each tubular valve controlling the return flow therethrough, and operating means common to both return valves for alternately causing the return valves to open and close the passages through their tubular valves respectively and when closed to unseat their tubular valves, direct mechanical connections between each return valve and the operating means, the seats for the tubular valves being themselves tubular and threaded into the housing and extending to the exterior thereof whereby they may be adjusted toward and away from the operating means to eliminate loose play between the tubular valves, the return valves and the operating means when all of the valves are in closed position.

3. A valve structure for a fluid drive wherein there is a fluid pressure source and a reversible fluid pressure operated motor, comprising means providing a housing having an inlet from the fluid pressure source, a pair of supply conduits leading to opposite sides of the motor and a return conduit for returning fluid to the source of supply, a tubular poppet type valve for each of the supply conduits controlling the flow of fluid from the inlet thereto and permitting fluid to be returned from the motor therethrough, a return valve for each tubular valve controlling the return flow therethrough, and operating means common to both return valves for alternately causing the return valves to open and close the passages through their tubular valves respectively and when closed to unseat their tubular valves, direct mechanical connections between the return valves and the operating means, means on said tubular valves presenting areas subject to inlet pressure which are effective to urge the valves toward the operating means with equal opposed effect whereby the valve structure will be always urged by fluid pressure into a neutral position wherein all valves are closed, the seats for the tubular valves being adjustable from the exterior of the housing toward and away from the operating means to eliminate loose play between the tubular valves, their return valves and the operating means when all of the valves are in closed positions.

4. A valve structure for fluid drives wherein there is a fluid pressure source and a reversible fluid pressure operated motor comprising means providing a housing having an inlet from the source, supply conduits leading to the opposite sides of the motor and a return conduit for returning fluid to the source, a tubular valve for each supply conduit controlling flow from the inlet thereto and allowing returning fluid to pass therethrough to the return conduit, return valves adapted to seat on the tubular valves and control fluid returning therethrough, a rock shaft having a flat side, and a direct mechanical connection operatively connecting the return valves to the flat side of the rock shaft on opposite sides of the axis of rotation of the rock shaft whereby upon rocking the rock shaft the return valves will be caused to alternately open and close their respective tubular valves and when closed to unseat their respective tubular valves, the valve seats of the tubular valves being adjustable toward and away from the rock shaft whereby loose play between the tubular valves, the return valves and the rock shaft when the valves are all closed may be eliminated.

5. A valve structure for fluid drives wherein there is a fluid pressure source and a reversible fluid pressure operated motor comprising means providing a housing having an inlet from the source, supply conduits leading to the opposite sides of the motor and a return conduit for returning fluid to the source, a tubular valve for each supply conduit controlling flow from the inlet thereto and allowing returning fluid to pass therethrough to the return conduit, return valves adapted to seat on the tubular valves and control fluid returning therethrough, a rock shaft having a flat side, and a direct mechanical connection operatively connecting the return valves to the flat side of the rock shaft on opposite sides of and equi-distant from the axis of rotation of the rock shaft whereby upon rocking the rock shaft the return valves will be caused to alternately open and close their respective tubular valves and when closed to unseat their respective tubular valves, said tubular valves presenting equal areas exposed to inlet pressure effective to cause the tubular valves, their return valves and mechanical connections to be urged against the rock shaft with equal effort to urge the rock shaft into a neutral position wherein all valves are closed.

6. A valve structure for fluid drives wherein there is a fluid pressure source and a reversible fluid operated motor comprising means providing a housing having an inlet from the source, supply conduits leading to the opposite sides of the motor and a return conduit for returning fluid to the source, a tubular valve for each supply conduit controlling flow from the inlet thereto and allowing return fluid to pass therethrough to the return conduit, return valves adapted to seat on the tubular valves and control fluid returning therethrough, a rock shaft having a flat side, and a direct mechanical connection operatively connecting the return valves to the flat side of the rock shaft on opposite sides of the axis of rotation of the rock shaft whereby upon rocking the rock shaft the return valves will be caused to alternately open and close their respective tubular valves and when closed to unseat their respective tubular valves, the valve seats of the tubular valves being tubular and extending to the exterior of the housing and being adjustable toward and away from the rock shaft whereby loose play between the tubular valves, their return valves and the rock shaft when the valves are all in closed position may be eliminated.

CARLOS BENJAMIN LIVERS.